(12) United States Patent
Mayle et al.

(10) Patent No.: US 9,330,329 B2
(45) Date of Patent: May 3, 2016

(54) SYSTEMS, METHODS, AND DEVICES FOR IMAGE MATCHING AND OBJECT RECOGNITION IN IMAGES USING MINIMAL FEATURE POINTS

(71) Applicant: Ditto Labs, Inc., Cambridge, MA (US)

(72) Inventors: Neil Lawrence Mayle, Cambridge, MA (US); Philip B. Romanik, West Haven, CT (US)

(73) Assignee: DITTO LABS, INC., Cambridge, MA (US)

( * ) Notice: Subject to any disclaimer, the term of this patent is extended or adjusted under 35 U.S.C. 154(b) by 0 days.

(21) Appl. No.: 14/745,397

(22) Filed: Jun. 20, 2015

(65) Prior Publication Data

US 2016/0012304 A1    Jan. 14, 2016

Related U.S. Application Data

(60) Provisional application No. 62/022,636, filed on Jul. 9, 2014.

(51) Int. Cl.
*G06K 9/62* (2006.01)
*G06K 9/46* (2006.01)
*G06K 9/00* (2006.01)

(52) U.S. Cl.
CPC .............. *G06K 9/46* (2013.01); *G06K 9/00208* (2013.01)

(58) Field of Classification Search
None
See application file for complete search history.

(56) References Cited

U.S. PATENT DOCUMENTS 6,751,363 B1 *   6/2004   Natsev ................... G06K 9/522
358/403

* cited by examiner

*Primary Examiner* — Chan Park
*Assistant Examiner* — Elisa Rice
(74) *Attorney, Agent, or Firm* — Siritzky Law, PLLC

(57) ABSTRACT

An image matching technique locates feature points in a template image such as a logo and then does the same in a test image. Feature points of a template image are determined under various transformations and used to determine a set of composite feature points for each template image. The composite feature points are used to determine if the template image is present in a test image. A covering set for a template image is used to optimize processing of test images.

13 Claims, 16 Drawing Sheets

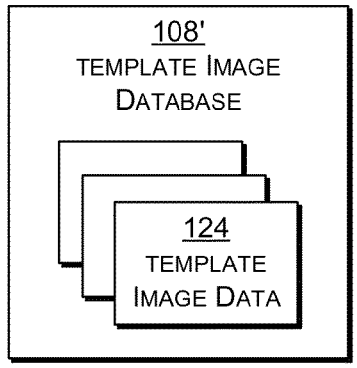
FIG. 2(A)
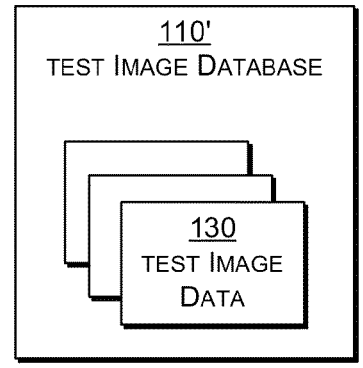
FIG. 2(C)
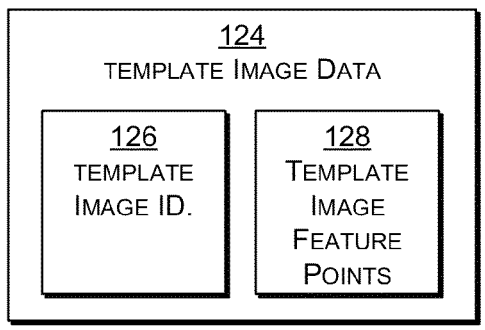
FIG. 2(B)
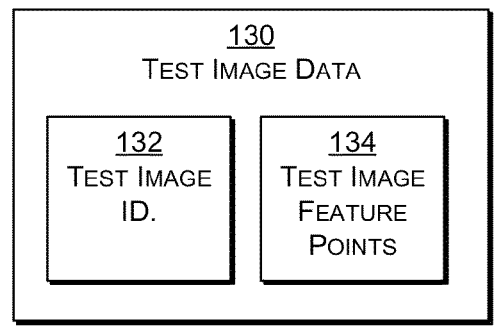
FIG. 2(D)
| IMAGE FEATURE POINTS | | |
|---|---|---|
| INDEX | LOCATION IN IMAGE (POSITION, SCALE, AND ROTATION) | DESCRIPTOR |
| 0 | L0 | D0 |
| 1 | L1 | D1 |
| ⋮ | ⋮ | ⋮ |
| K-1 | $L_{K-1}$ | $D_{K-1}$ |
FIG. 2(E)

| 136 MATCH IMAGE DATA |||
|---|---|---|
| 138<br>TEST IMAGE ID. | 140<br>TEMPLATE ID. | 146<br>NUMBER OF FEATURE POINTS IN TEMPLATE |
| 148<br>MATCH SET |||

| 148' MATCH SET |||
| --- | --- | --- |
| TEMPLATE POINT | TEST POINT | DISTANCE |
| P1 | P'1 | D1 |
| P2 | P'2 | D2 |
| ⋮ | ⋮ | ⋮ |
| P$_N$ | P'$_N$ | D$_N$ |

| COMPOSITE FEATURE POINTS | |
|---|---|
| TEMPLATE IMAGE | COMPOSITE FEATURE POINTS |
| TI1 | CFP1 |
| TI2 | CFP2 |
| ⋮ | ⋮ |
| TI$K$ | CFP$K$ |

FIG. 2(J)

SYSTEMS, METHODS, AND DEVICES FOR IMAGE MATCHING AND OBJECT RECOGNITION IN IMAGES USING MINIMAL FEATURE POINTS

RELATED APPLICATIONS

This application claims the benefit of U.S. Provisional Application No. 62/022,636, filed Jul. 9, 2014, the entire contents of which are hereby fully incorporated herein by reference for all purposes.

COPYRIGHT STATEMENT

This patent document contains material subject to copyright protection. The copyright owner has no objection to the reproduction of this patent document or any related materials in the files of the United States Patent and Trademark Office, but otherwise reserves all copyrights whatsoever.

FIELD OF THE INVENTION

This invention relates to image processing, and, more particularly, to enhanced techniques for image matching and object recognition in images.

BACKGROUND

Image processing techniques exist for trying to determine whether one image is present in another image. More specifically, techniques exist for trying to determine whether one or more objects in one image are present in another image. Such object recognition/identification/location techniques vary in speed and accuracy, but do not scale well to real time and on-the-fly processing of multiple images.

It is desirable to provide object recognition/identification/location image processing techniques that improve the speed and/or accuracy of such techniques. It is further desirable to provide image processing techniques for object recognition/identification/location that support and scale to accurate real-time, on the fly, and batch processing of multiple images.

BRIEF DESCRIPTION OF THE DRAWINGS

Other objects, features, and characteristics of the present invention as well as the methods of operation and functions of the related elements of structure, and the combination of parts and economies of manufacture, will become more apparent upon consideration of the following description and the appended claims with reference to the accompanying drawings, all of which form a part of this specification.

FIGS. 2(a)-2(j) show aspects of databases and data structures used by the system of FIG. 1, according to exemplary embodiments hereof;

DETAILED DESCRIPTION OF THE PRESENTLY PREFERRED EXEMPLARY EMBODIMENTS

Glossary and Abbreviations

Figure 1:
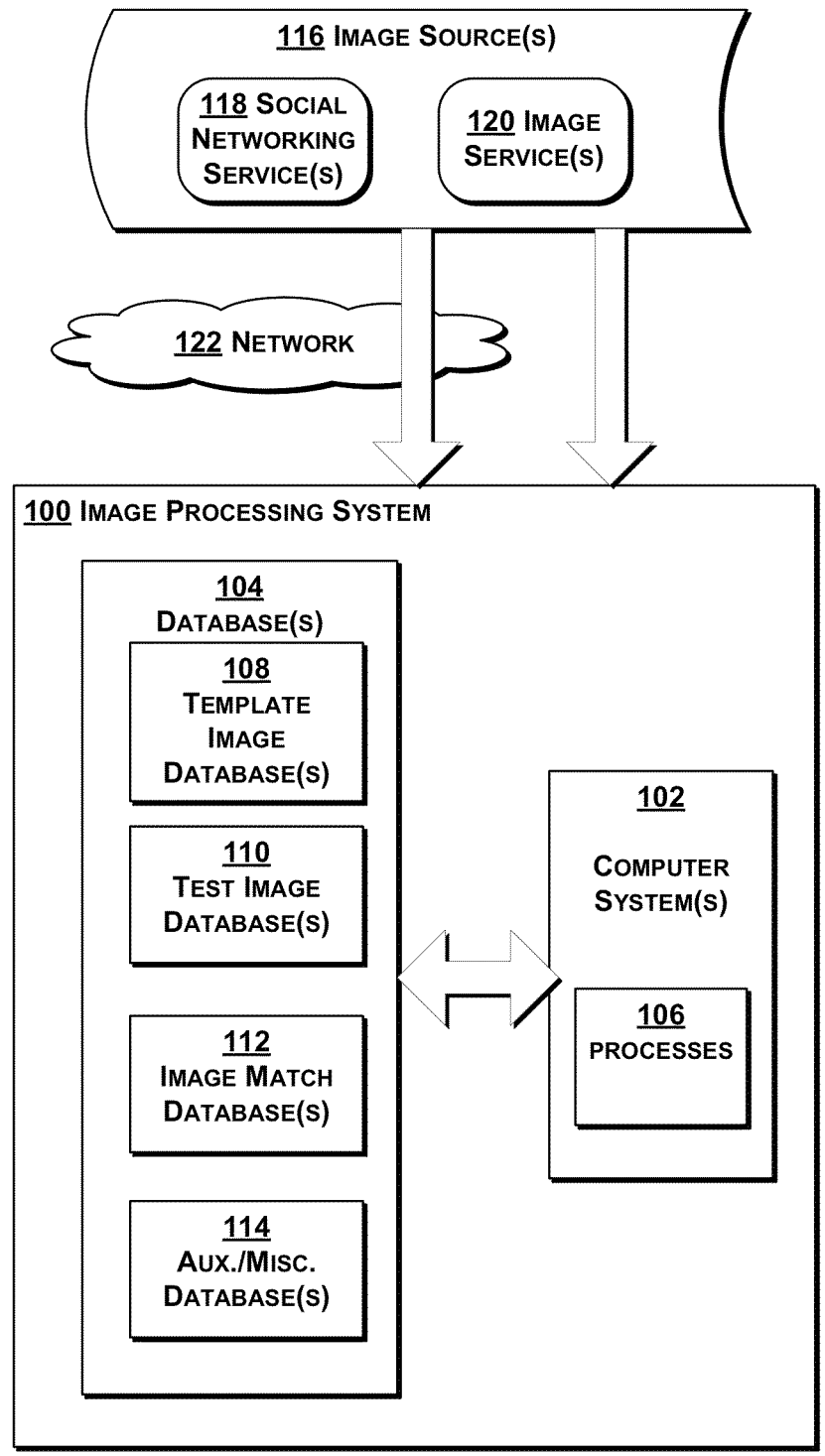
FIG. 1 depicts an overview of a system according to exemplary embodiments hereof.

As used herein, unless used otherwise, the following terms or abbreviations have the following meanings:

FLANN means Fast Library for Approximate Nearest Neighbors;

GLOH means Gradient Location and Orientation Histogram;

MSER means maximally stable external regions;

PCA-SIFT means Principal Components Analysis SIFT;

RANSAC refers to RANdom SAmple Consensus;

RBF means radial basis function;

SIFT means Scale-Invariant Feature Transform;

SURF means Speeded Up Robust Features;

SVM means support vector machine;

URL means a Uniform Resource Locator; and a "mechanism" refers to any device(s), process(es), routine(s), service(s), or combination thereof. A mechanism may be implemented in hardware, software, firmware, using a special-purpose device, or any combination thereof. A mechanism may be integrated into a single device or it may be distributed over multiple devices. The various components of a mechanism may be co-located or distributed. The mechanism may be formed from other mechanisms. In general, as used herein, the term "mechanism" may thus be considered to be shorthand for the term device(s) and/or process(es) and/or service(s).

Background

For some problems where image matching is used, a given template matches very few of the test images. For example, for finding images in social media containing brands, a single template for a brand typically does not match more than a fraction of 1% of the images posted in social media. This means that the vast majority of the time is spent attempting to match a template against a test image that does not contain the template or a transformed version of the template. We refer these test images as non-matches for the template. Some images that do not contain the template may produce false positive matches with the template, but this is typically a much, much smaller quantity than the non-matches. Given the ratio of candidate matches to non-matches for a template, speeding up the process of rejecting non-matches can have a large impact on overall run time for a given test image.

A core aspect of the matching algorithm is finding the nearest neighbors for each feature point. The time for computing the nearest neighbors for all feature points is related to the number of feature points for both the template and the test image.

If the nearest neighbor calculation is done in an exhaustive fashion using a linear search over all the feature points for the template and all the feature points for the test image, then the matching time is proportional to the product of the number of feature points for the template and the number of feature points for the test image, that is $O(n^2)$.

Other non-exhaustive approaches are possible. For example, using FLANN, forest of kd-trees, hierarchical k-means, locality sensitive hashing, and other sorted structures to organize and more efficiently search the feature points of the template. (FLANN is a library for performing fast approximate nearest neighbor searches in high dimensional spaces. It contains a collection of algorithms we found to work best for nearest neighbor search and a system for automatically choosing the best algorithm and optimum parameters depending on the dataset.) However, these techniques are approximate and only produce the approximate nearest neighbors. They miss some of the nearest neighbors and their performance advantage decreases as their precision increases.

Similar data structures and approximate algorithms may be used for the test image.

Many of the feature descriptors are very high dimensional. For example, SIFT descriptors typically have 128 components, and the speedup from a sorted structure is less than might be hoped especially as the required precision approaches 100% (see Lowe).

With approximate neighbors the matching time would no longer be linear in the number of feature points in the template, but in all cases reducing the number of feature points under consideration for the template (or the test image) will reduce match time.

Description

As shown in FIG. 1, an image processing system 100 according to exemplary embodiments hereof includes one or more computer systems 102 operatively connected to one or more databases 104. Processes 106 running on the computer system(s) 102 interact with the databases 104 as described herein.

The database(s) 104 preferably include one or more template image databases 108, one or more test image databases 110, one or more image match databases 112, and one or more auxiliary/miscellaneous databases 114, each described in greater detail below. The one or more template image databases 108 may also be referred to herein as template image database(s) 108. Similarly, the one or more text image databases 110 may also be referred to herein as text image database(s) 110; and the one or more image match databases 112 may also be referred to herein as image match database(s) 112. The various databases may be implemented in any known manner, including as a file system in an operating system, and the system is not limited by the manner in which any particular database is implemented or maintained or accessed. There is no requirement for the databases to be implemented in the same manner. The database(s) 104 may be co-located with each other and/or with the computer system(s) 102, or they may be remotely located. The database(s) may be distributed.

The image processing system 100 obtains images from one or more image sources 116 (also referred to as image source(s) 116), which may include one or more social networking services 118 (e.g., Facebook, Twitter, and the like) and other image generating or providing services 120. The image processing system 100 may obtain the images via a network 122 (e.g., the Internet) and/or in some other manner. It should be appreciated that the image processing system 100 may obtain images from different image sources in different manners.

In some cases an image source 116 may provide a link (e.g., a URL or the like) to a web page or the like containing one or more images. The image source 116 may have pre-filtered the web pages to include links only those that it considers contain one or more images. The image source 116 may also provide meta-data about the link and/or the webpage. This meta-data may include location and or user information.

With reference now to FIG. 2(a), an exemplary template image database 108' may contain template image data 124 for multiple template images. As used herein, a template image refers to an image that is to be looked for in other images. A template image may be any image, including one or more of: a logo, a face, textual information, etc. A template image may be fully or partially machine generated. The system is not limited by the content of template images or the way in which they are generated, obtained, or stored.

Figures 2F, 2G:
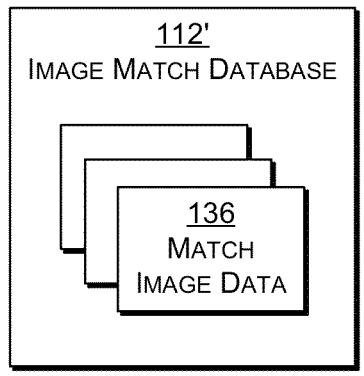
Figure 3A:
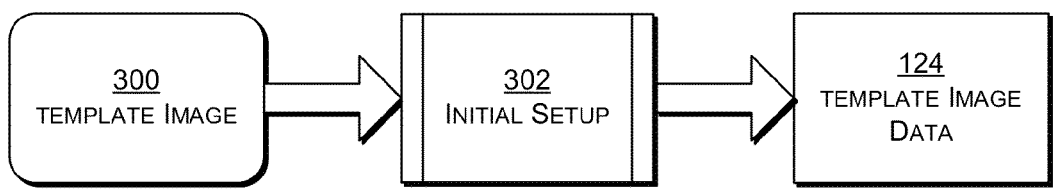
FIGS. 3(a)-3(e) show exemplary processing in the system of FIG. 1, according to exemplary embodiments hereof.

The template image data 124 for a particular template image may be generated in an offline process, as shown, e.g., in FIG. 3(a), in which a template image 300 is processed by an initial setup mechanism 302 to produce template image data 124 corresponding to the template image 300. Preferably each template image is uniquely identifiable within the system, and, as shown in FIG. 2(b), exemplary template image data 124 may include a template image identifier 126 and template image feature points 128 (e.g., generated by the initial setup mechanism 302). A copy of each template image is preferably also maintained in database(s) 104, preferably in template image database(s) 108, and each template image is preferably accessible in the database(s) 104 using its corresponding template image identifier 126.

Features are locations within an image that can be used by a matching algorithm to try to find instances of a template image in a test image. The features may also include a description of the image at or near that point. Feature points are preferably picked in such a way that the equivalent locations will also be picked if the image is transformed in various ways (e.g., lighting changed, rotated, scaled, tilted). The feature descriptors are preferably designed to be invariant across a various transformations to the image.

As shown in FIGS. 2(c)-2(d), an exemplary test image database 110' contains test image data 130 for multiple test images. As noted above, test images may be obtained, e.g., from image source(s) 116. Once obtained by the system 100 images are preferably assigned a unique test image identifier 132 and are stored in test image data 130 the test image database(s) 110 associated with the test image identifier 132. It should be appreciated that it is preferable to store a copy of the test image in the test image database(s) 110. Once a test image has been processed (as described in greater detail herein), the test image data 130 associated with the test image may include test image feature points 134.

The image feature points (template image feature points 128, FIG. 2(b) and test image feature points 134, FIG. 2(d)) may be stored in an image feature points structure, such as the exemplary logical structure shown in FIG. 2(e). Assuming there are k image feature points for a particular image, the logical structure includes an index (0 to k−1) for the feature point, a location in the image (e.g., a pixel) associated with the feature point, and a descriptor of the feature point. The form of the descriptor will depend on the feature descriptor algorithm used, as described in greater detail below. In a present implementation the feature descriptors are SIFT descriptors. Those of ordinary skill in the art will realize and appreciate, upon reading this description, that different and/or other descriptors may be used. For example, the feature descriptors may be SURF or PCA-SIFT or GLOH descriptors. PCA-SIFT is described, e.g., in Yan Ke and Rahul Sukthankar. 2004. *PCA-SIFT: a more distinctive representation for local image descriptors*," in Proc. of the 2004 IEEE Computer Society Conference on Computer vision and pattern recognition (CVPR'04) IEEE Computer Society, Washington, D.C., USA, 506-513, the entire contents of which are hereby fully incorporated herein by reference for all purposes. GLOH descriptors are described, e.g., in Krystian Mikolajczyk and Cordelia Schmid "A performance evaluation of local descriptors", IEEE Transactions on Pattern Analysis and Machine Intelligence, 10, 27, pp. 1615-1630, 2005, the entire contents of which are hereby fully incorporated herein by reference for all purposes. SURF descriptors are described, e.g., in Herbert Bay, Andreas Ess, Tinne Tuytelaars, Luc Van Gool, "SURF: Speeded Up Robust Features", Computer Vision and Image Understanding (CVIU), Vol. 110, No. 3, pp. 346-359, 2008, the entire contents of which are hereby fully incorporated herein by reference for all purposes. In addition, feature descriptors may be generated using deep learning convolutional neural networks. For example, Fischer, et al, "Descriptor Matching with Convolutional Neural Networks: a Comparison to SIFT," May, 2014, the entire contents of which are hereby fully incorporated herein by reference for all purposes, describe SIFT-like features that are generated by a neural network for the location identified by a SIFT detector as well as matching these descriptors.

In a presently preferred exemplary implementation the features are detected using an image pyramid of Laplacian-filtered images to locate one set of features for the whole image. Those of ordinary skill in the art will realize and appreciate, upon reading this description, that different and/or other approaches to feature detection may be used. For example, in some alternate approaches features may detected using SIFT or MSER, or feature sets may be found for interesting regions of the test image and each region can be matched separately.

Feature detection may find hundreds of features for the template image and similarly, hundreds of features for the test image.

Those of ordinary skill in the art will realize and appreciate, upon reading this description, that any data structures shown herein are merely examples, and that different and/or other data structures and organizations may be used.

FIG. 2(f) shows an exemplary image match database 112' containing match image data 136 for one or more (preferably multiple) images.

Figure 3B:
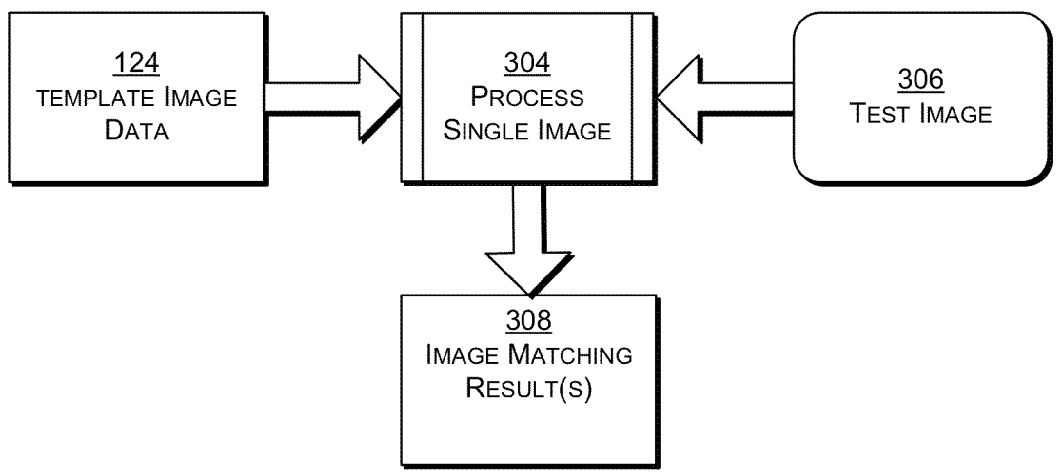

As shown in FIG. 3(b), in operation, the image processing system 100 may process a single test image 306 (at 304) with respect to particular template image data 124 to determine whether or not the template image corresponding to the template image data 124 is present in the single test image 306. If a match is found, i.e., if the process single image mechanism 304 determines with sufficient certainty that the template image corresponding to template image data 124 is present in the image 306, then the process produces image-matching results 308. The image matching results 308 may include an indication of where the template image is located in the single image 306 and may also include other information about the match. The image matching results 308 may be stored, e.g., in match image data records 136 in the image match database(s) 112.

Figure 6A:
FIGS. 6(a)-6(d) show examples of the matching one or more portions of a template image to a test image.
Figure 6B:
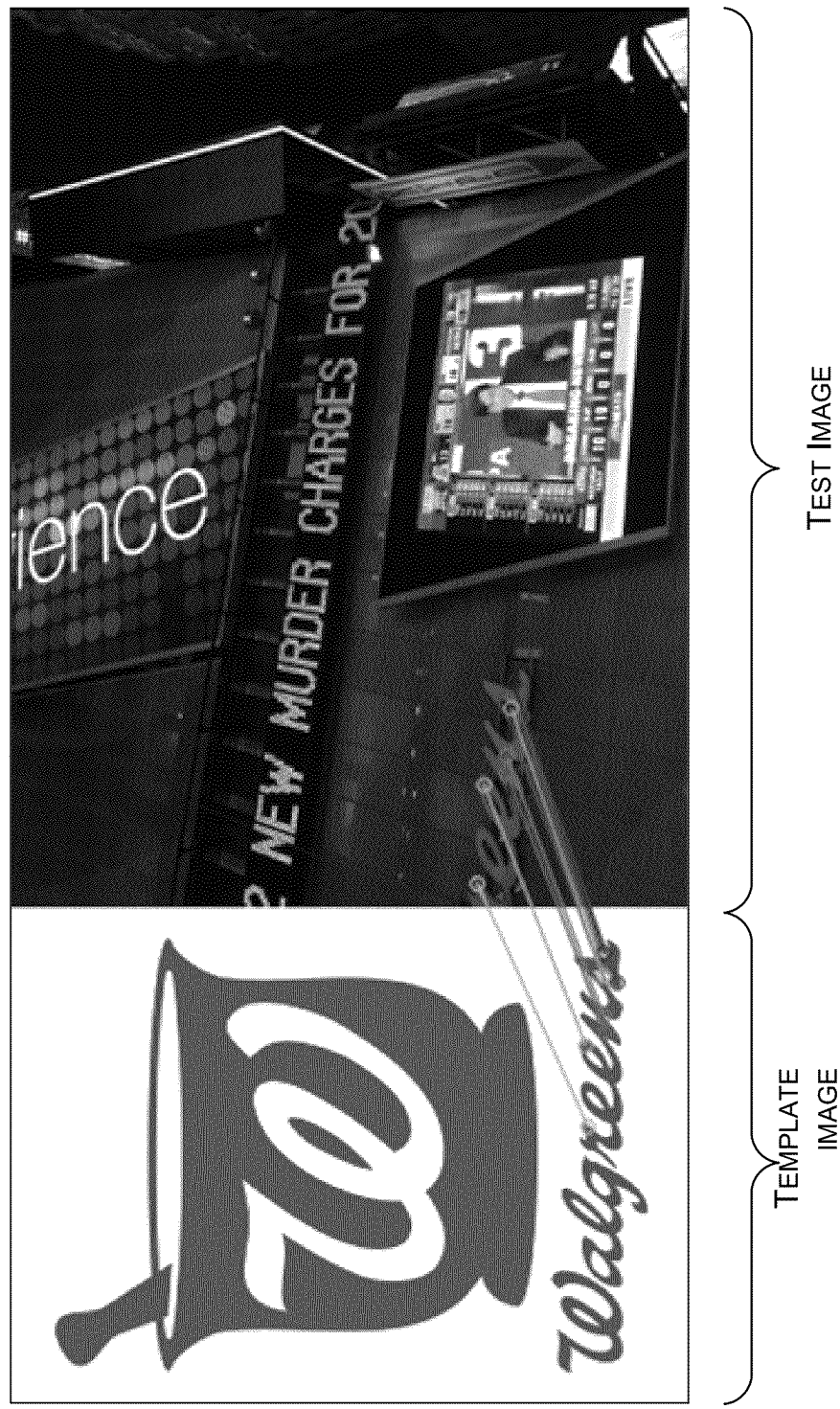
Figure 6C:
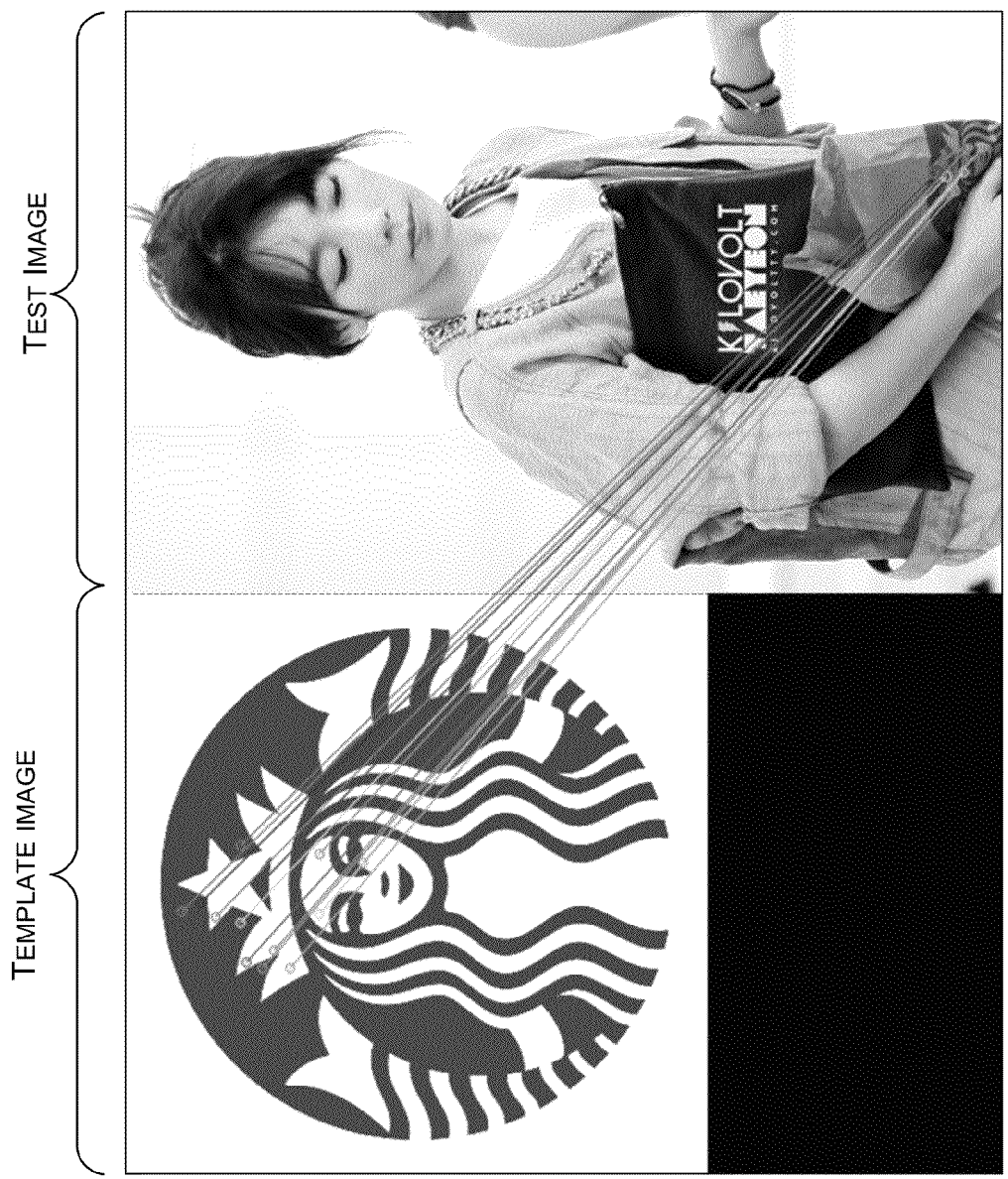
Figure 6D:
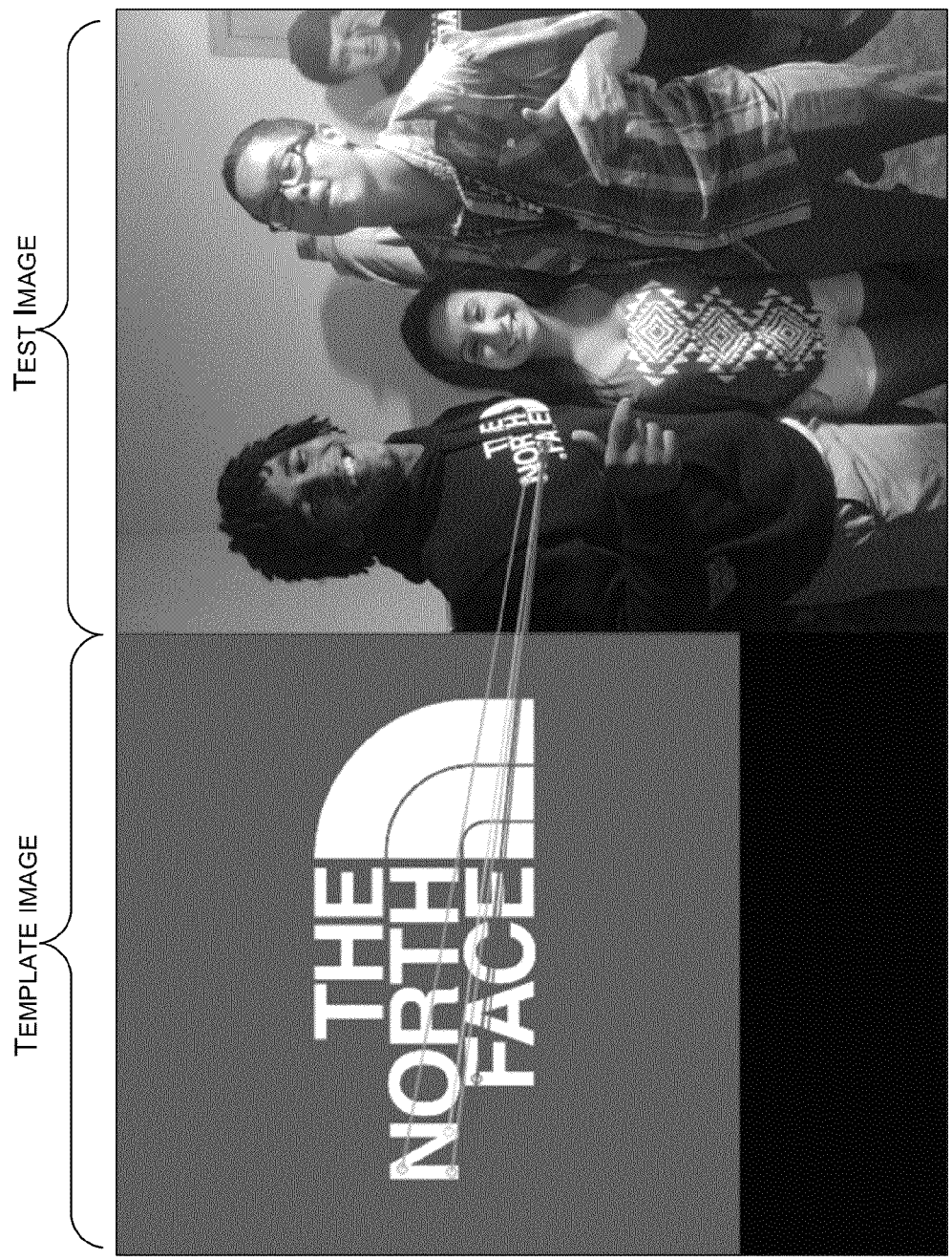

As used herein, a template image is considered to be present in a test image if at least some portion of the template image is in the test image. It should be appreciated and understood that it is not necessary that the entire template image be in the test image in order for the template to be in the test image (see, e.g., FIGS. 6(a)-6(b)), nor is it necessary for the portions of the template that are in the test image to be contiguous or uninterrupted in the test image (see, e.g., FIG. 6(d), where non-contiguous parts of the template image are in the test image).

Matching is done between features of the template images and the features of the test image, and the matching process finds feature points that correspond between the two images. Two feature points correspond/match if the descriptions of the two feature points are similar enough. A similarity measure (e.g., a distance) is used between the two points and if the distance is within some limit then the two feature points are considered matches. The results of the matching process between a template image and a test image is a set of pairs of feature points called the match set. The first element of the pair is a feature of the template image and the second element of the pair is a feature of the test image. Associated with each pair of features is a measure of the similarity of the two features.

In presently preferred exemplary embodiments hereof, as shown e.g., in FIG. 2(g), in some modes, the match image data 136 may include: (i) a test image identifier 138 (corresponding to the unique identifier of the matched test image in the system); (ii) a template image identifier 140 (corresponding to the unique identifier of the matched template image in the system); (iii) (v) the number of feature points in the template 146; and (iv) a match set 148. It should be appreciated that some of these fields may not be present or used in all embodiments hereof.

Figures 2H, 2I:
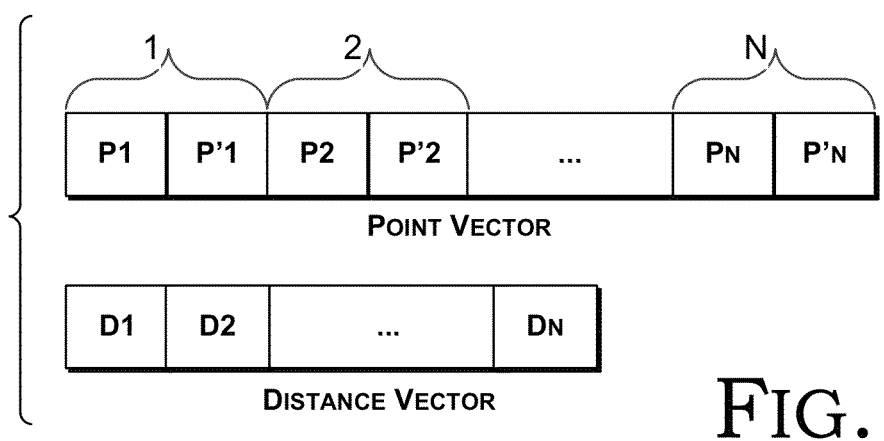

An exemplary match set (which may be part of the match image data 136) preferably includes a list of matched points from the template image and the test image, along with the distance between them. Thus, e.g., the exemplary match set 148' in FIG. 2(h) includes N matches $(P_1, P'_1), (P_2, P'_2), \ldots (P_N, P'_N)$, with corresponding distances $D_1, D_2, \ldots D_N$. In this example, according to the matching algorithm, point $P_i$ in the template image matches or corresponds to point $P'_i$ in the test image, for i=1 to N, where $D_i$ is a distance for points $P_i$ (in the template image) and $P'_i$ (in the test image). In some implementations a match set 148 may be stored as a point vector comprising pairs of matched points along with a distance vector of the corresponding distances.

As shown in FIG. 3(b), the mechanism 304 attempts to match a single template image with a single test image. However, in operation, a system 100 may attempt to match a particular test image with multiple template images, as shown, e.g., in FIG. 3(c). The mechanism 304 (to process a single test image with respect to a single template image) may thus be invoked repeatedly for multiple template images whose template image data 122 are stored in the template image database(s) 108. In some exemplary embodiments the routine 304 may terminate when a match is found for a template image. In other embodiments the mechanism 304 may continue to look for other matches (e.g., with other template images) even after a match is found.

As shown above with reference to FIG. 1, image-processing system 100 may obtain test images from image source(s) 114. These test images may be obtained in a batch and/or as one or more streams of images 310. For example, there may be a stream of images corresponding to each image source. With reference to FIGS. 3(d)-3(e), the process image stream(s) mechanism 308 processes the images 306 in image stream(s) 310 (from the image source(s) 114) to determine whether one or more template images match images in the image batch/image stream(s) 310. In some embodiments this process may be implemented by repeatedly invoking the process single image mechanism 304 for images in the image stream(s) to determine whether any template images match the image stream images.

The mechanisms (process single image, process image stream(s), etc.) may correspond to processes 106 running on the computer system(s) 102.

In some real-world system, the image streams may contain millions of images, produced at a rate exceeding 2 million images per day (about 1,400 images per minute).

Processing a Single Image

Figure 3C:
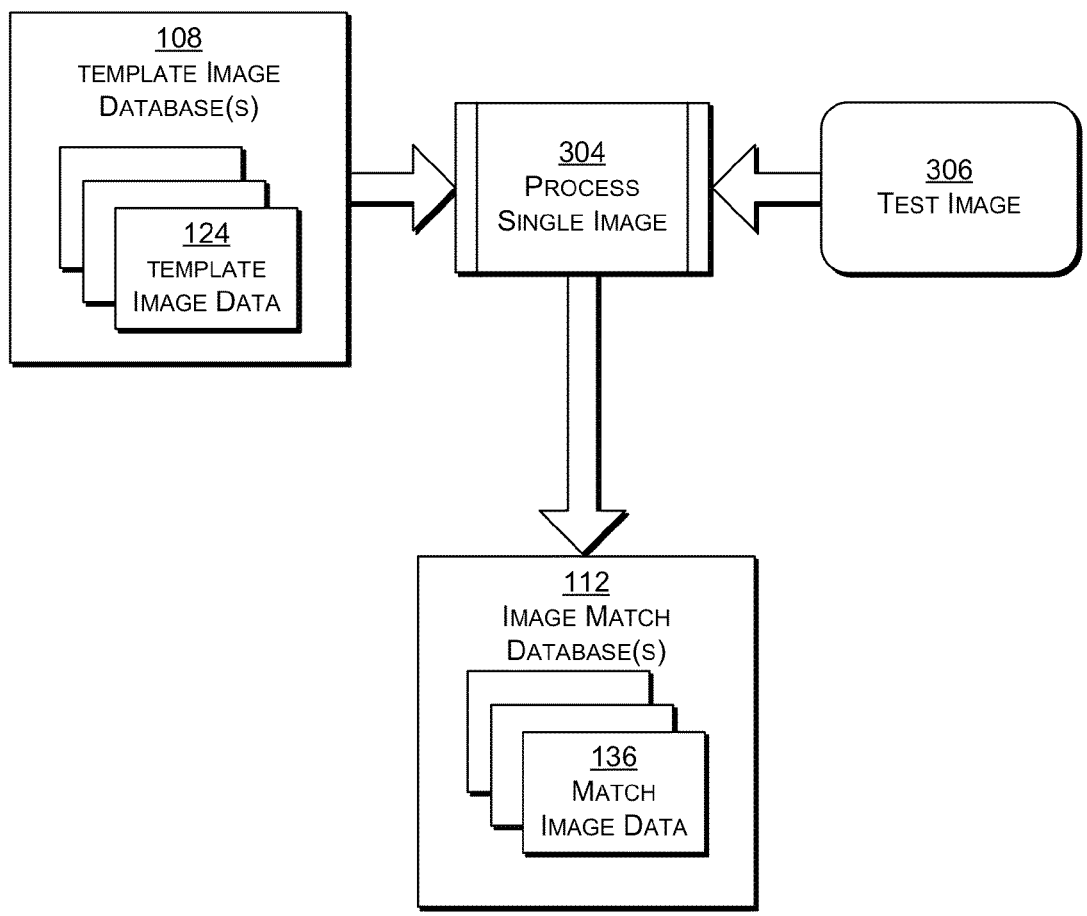
Figure 3D:
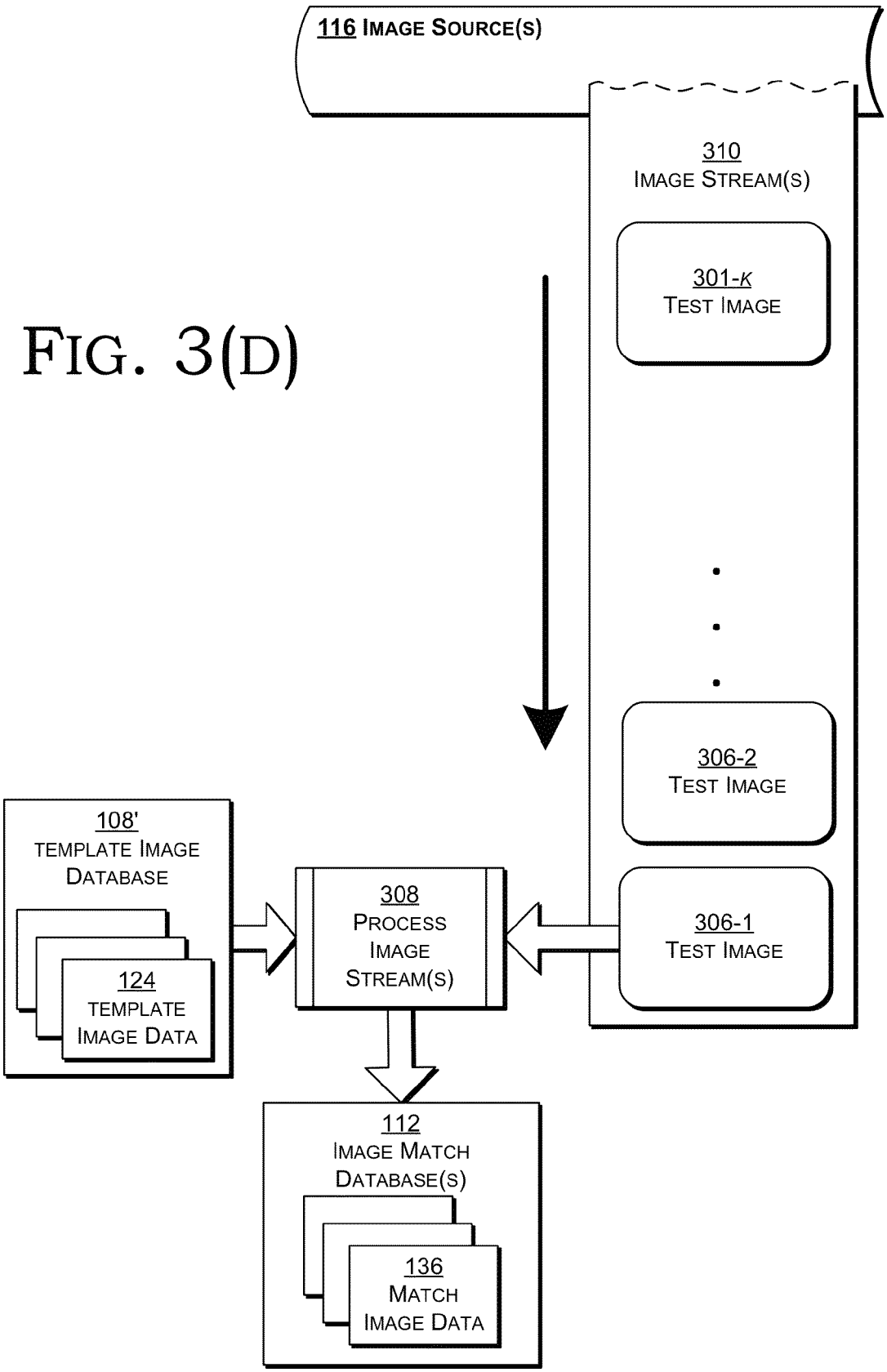
Figure 3E:
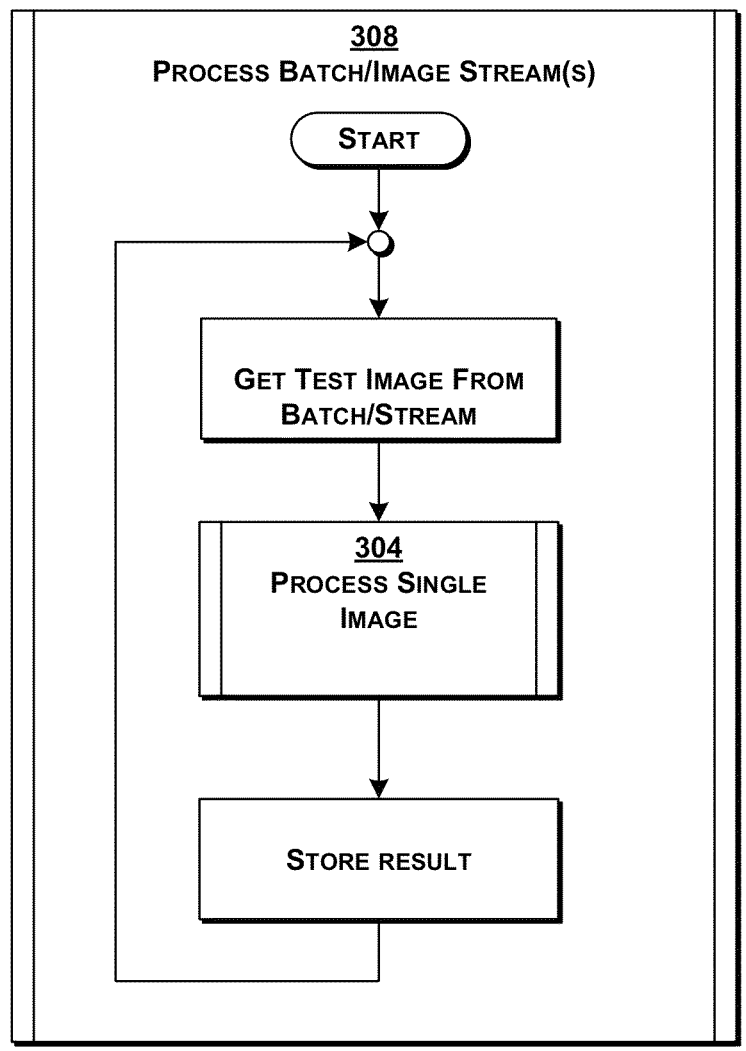

An exemplary mechanism to process a single image (corresponding to 304 in FIGS. 3(b) and 3(c)) is described in David G. Lowe. 2004. Distinctive Image Features from Scale-Invariant Keypoints. Int. J. Comput. Vision 60, 2 (November 2004), 91-110, hereinafter "Lowe", and in U.S. Pat. No. 6,711,293, to Lowe, the entire contents of both of which are hereby fully incorporated herein by reference for all purposes. Lowe's technique is sometimes referred to as SIFT.

An image may be decomposed into a number of feature points to describe the visual content of the image. Feature points may be generated at predetermined locations (i.e., at a certain position, and radius) in an image, or computed from features found in an image. When feature points are chosen that are invariant to change (such as to translation or rotation), these feature points may be used to determine whether two images are related to each other.

For example, if two photographs are taken of the same scene from slightly different vantage points, each image will contain similar features in the overlap region between the images. When the feature points from each image are compared, it is possible to determine if the two images are related, and the coordinate transformation of how they are related.

Feature point matching may also be used to see if a template is found in an arbitrary image. A template may be a real or an artificial image that expresses a pattern to be found in the image. The template may be any image, including a computer generated brand logo. In this case, the matching operation can determine if the brand logo is present in a second image, and if so, where in the second image the brand logo is located.

Matching a template against an image generally includes a number of steps, namely:
1. Feature point extraction from the template image.
2. Feature point extraction from a test image.
3. Match feature points from template image with feature points in a test image.
4. Match feature points in a test image with the feature points from the template image.
5. Eliminate non-symmetrical matches.
6. Compute the best image transformation between the matching points.
7. Determine if the template image is present in the test image.

Feature Point Extraction

There are many feature detectors that may be used to implement the feature point extraction of the first two steps, including ones such as SIFT (Scale-Invariant Feature Transform), and SURF (Speeded Up Robust Features) that can detect features which are scale and rotationally invariant.

Feature point extraction from an image consists of two steps. The first step is to determine positions in the image that are stable (i.e., that do not move) over small and moderate amounts of image transformation such as scale and rotation. These locations define so-called keypoints in the image. A keypoint describes a two-dimensional (2D) location (e.g., (x, y) coordinates) and the angle (or orientation) of the feature (SIFT keypoints specify a 2D location, scale, and orientation).

The second step of feature point extraction is to extract a so-called descriptor (e.g., a numeric signature) from each feature point. For example, an implementation of the SIFT descriptor has 128 values that encapsulate the orientations in a region that surrounds the keypoint. Numeric descriptor values are often normalized such that the descriptor is of unit length. This normalization improves the descriptors invariance to illumination changes.

It should be appreciated that steps 1 and 2 generally differ as to when the feature point extraction is computed. Typically the template image is known in advance and the feature point information can be constructed beforehand. Feature point extraction of a test image may be computed when the image is analyzed, and compared with the previously computed information from the template image.

Matching Feature Points

The third and fourth steps match (or attempt to match) feature points from one image to feature points from another image. This matching may be accomplished, e.g., by computing the nearest neighbors of each descriptor from a first image to descriptors in a second image. Descriptors come in many varieties ranging from binary (one-bit of information) to numeric for each element in the descriptor. For numeric descriptors, the nearest neighbors may be determined by the descriptors with the shortest distance. Although many distance formulas can be used, the L2 (Euclidean) distance is preferred. For each descriptor in one image, the closest matches (usually two) from the second image are computed.

Lowe describes a ratio test that computes the ratio of the smallest distance from a keypoint in a first image to a keypoint in a second image, to the second smallest distance from the same keypoint in the first image to a second keypoint in the second image. A large ratio (Lowe used a threshold of 0.8) may be used to indicate that two keypoints in the second image are similar to the keypoint in the first image. When this condition arises, there is no matching keypoint in the second image to the keypoint in the first image. This process is carried out by comparing every keypoint in one image to the keypoints in the second image.

The third and fourth steps differ in the direction of matching. In the third step the keypoints from the template image are compared with the keypoints in the test image. In the fourth step the keypoints in the test image are compared with the keypoints in the template image.

Eliminating Non-Symmetrical Matches

The fifth step enforces a constraint that the best matching points between a first image and a second image should be the best matching points between the second image and the first image. This symmetric matching step discards the matches found in the third and fourth step if the best matches do not refer to each other.

Computing the Best Image Transformation Between the Matching Points

The sixth step takes as input the keypoints from the template image that match the keypoints in the test image, and computes a geometric relationship between the points in each image. Many different methods can be employed to determine these relationships, including using a Hough transform (see, e.g., Lowe), affine transformation, or homography. A homography computes the projective transform to describe the relationship between two coordinate systems. The points determined from the fifth step do not necessarily share the same geometric transformation. One reason is that the points come from different, non-related, portions of the image. Another reason is that points belong to related objects, but the objects are grossly distorted. The RANSAC (RANdom SAmple Consensus) algorithm may be employed to find the best subset of matching points to compute the best transformation between two images. The RANSAC algorithm is described in Fischler, M. A., et al (June 1981). "Random Sample Consensus: A Paradigm for Model Fitting with Applications to Image Analysis and Automated Cartography," Comm. of the ACM 24 (6): 381-395, the entire contents of which are hereby fully incorporated herein by reference for all purposes.

Determining if the Template Image is Present in the Test Image

The seventh step identifies whether the template image is present anywhere in the test image. The result of the sixth step is either: (i) no homography (insufficient matching points exist between the template image and test image), (ii) an incorrect homography, or (iii) a valid homography.

An invalid homography is one in which the matching points between the template image and test image returns a mathematically valid result, but one which is impossible in the natural world. Invalid homographies are treated as though no homography was computed.

A valid homography is used to establish the coordinate system relationship between points in the template image with the points in the test image. However, the homography might be valid only over a small region of the image, rather than over the entire area of the template image. In some cases this is acceptable if the template in the test image is obscured or distorted. In other cases, the matching region may be small because the template image is not found in the test image. For example, a portion of a letter in the template image may match the corresponding letter in the test image. This does not mean that the template image is present in the test image, only that they share a small common region. One common method to determine if the template image is present in the test image is to define a minimum overlap size between the template image and test image. A match between the template image and test image is returned only if the overlap area exceeds this threshold.

Using Minimal Cover Sets

As described above, matching a template against an image generally includes a number of steps, including matching feature points from template image with feature points in a test image. The observed structure of the feature space may be used to speed up matching of a test image against a template or a large set of templates by more rapidly rejecting non-matches. The matching may be performed in two stages in a cascade structure.

The first phase is a filtering process that determines if a single template's feature points can possibly match the feature points of the test image. If the first phrase determines that the template may match, then we proceed to the second stage. The second stage uses the normal process of exhaustive search for nearest neighbors or one of the approximate nearest neighbor algorithms. The first stage is designed to be much faster than the second stage. It should be appreciated that the first stage is not exact, and that it may characterize some non-matches as possible matches. The first stage may also occasionally characterize some true positive matches as non-matches, but it is designed to do that very infrequently since that would reduce the overall sensitivity of the matching.

In the cases where the first stage does not filter a possible match, it is extra work compared to the typical matching process. However, given the expected ratio of non-matches to candidate matches, if the filter is good enough, it will be the only stage that is run most of them time, and if it is faster enough, this is expected to result in a significant net reduction in average processing time of multiple test images with respect to multiple template images.

In some alternative embodiments hereof, the second stage may take advantage of results of first stage and do a modified version of the normal matching process.

Given a large enough set of true positive matches for a given template we can determine empirically which feature points of a template never participate in a match, which are useful, and which are necessary. The true positives used for this analysis can be hand tagged/labeled candidate matches or they can also include be matches that have be determined by a classifier to be true positive matches. Exemplary classifiers are described in co-pending and co-owned U.S. application No. 62/022,619, filed Jul. 9, 2014 and titled, "Systems, Methods, And Devices For Image Matching And Object Recognition In Images Using Template Image Classifiers," and U.S. patent application Ser. No. 14/745,363, filed Jun. 19, 2015, the entire contents of both of which are hereby fully incorporated herein by reference for all purposes.

For example, for the detector and feature descriptors used in this system we have observed for a large set of test images (a few thousand), that although there are many feature points associated with a template image, only half of all of the template feature points are involved in any of the true positive matches. We refer to these as active feature points. Accordingly, in some embodiments hereof, eliminating the non-active feature points is expected to offer some useful speedup in the matching process.

More importantly, a small set of feature points are found to be involved in most of the true positive matches and the rest of the points are involved in fewer true positive matches. Stated mathematically, a small set of feature points is a covering set for all of the true positive matches. The set covering problem is described, e.g., in http://en.wikipedia.org/wiki/Set_cover_problem.

In this instance, a covering set is the smallest selection of feature points for a template such that one of the feature points in the selection is part of the match set of every true positive match. This set is also referred to as the minimum set cover.

The covering set may be computed for a given group/set of true positive matches. We have empirically observed for many template images that while roughly half of the feature points are active, a much smaller set of template feature points will cover every true positive match. One value of a covering set for the template image feature points is that if a test image does match any of the feature points in the covering set, then it is highly unlikely to be a true positive match.

It should be appreciated that since a covering set is determined empirically from the matching process run with a finite set of test images, we cannot state categorically that every test image exists that will be a true positive match for template will have a feature point that matches one of the covering set feature points. However, if the set of test images used is large enough and representative of the population of test images that will be used in the future, then we have confidence in our result. We have also observed that after a large enough number of test images (e.g., 1,000 test images), while the covering set may grow in size or change, the new feature points only cover a very small percentage of the true positive matches.

In some aspects hereof, the cover set may be recomputed on a new set of test images.

A primary objective of computing the covering set is not to eliminate feature points in the matching process. Instead we are looking to use the covering set in the first stage of a two-stage match where the first stage filters out images that are very unlikely to result in a match.

Overview

There are several steps to prepare for using minimal feature point filtering for a template. The result of these steps is a set of minimal feature points and a vector distances. The preparation only has to happen once for a template. After the preparation is completed the filter step can be run as part of the match process for every new test image that needs to be matched.

To prepare for the filter, first we match a set of test images against a template. Then we hand tag a set of candidate matches for this template or, if we have already trained a classifier, we may use the classifier to tag the candidate matches as true positive matches or false positive. The use of a classifier to label true and false positive matches is described in co-owned and co-pending U.S. patent application No. 62/022,619, and U.S. patent application Ser. No. 14/745,363, filed Jun. 19, 2015, the entire contents of both of which are hereby fully incorporated herein by reference for all purposes. The set of true positive matches may then be used to compute the maximum matching distance for all of the feature points of the template. We use the true positive matches and the set of non-matches to determine how well each template feature point discriminates between matches and non-matches. We also compute a minimum covering set of true positive matches. The result is a subset of the feature points of the template.

Once the preparation is completed, the minimum covering set and maximum matching distances may be used as a new first stage of the matching process for the template. The first stage then efficiently filters many test images that are highly unlikely to match the template. The addition of this stage speeds up the overall matching process.

Figure 4A:
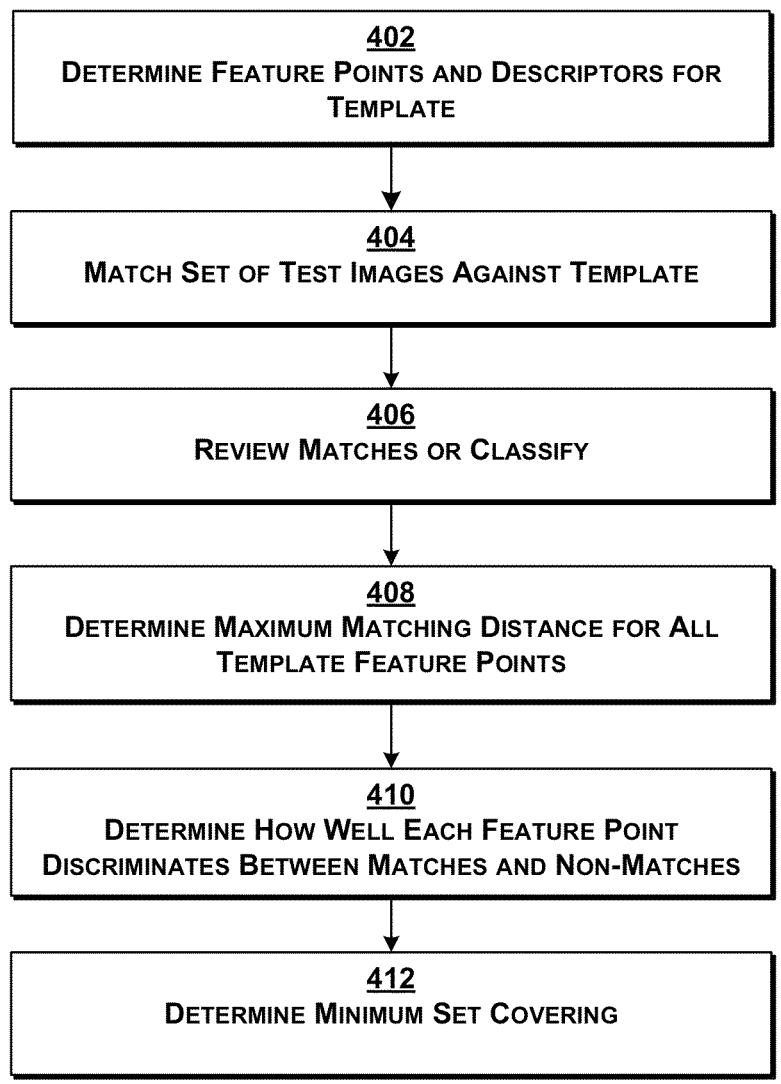
FIGS. 4(a)-4(b) are flowcharts showing exemplary processing according to exemplary embodiments hereof.

An exemplary process/mechanism is described here with reference to the flowchart in FIG. 4(a).

Determine Feature Points and Descriptors for Template

With reference to FIG. 4(a), at 402, the first step in our process is to determine/extract the feature points for the template image and to calculate the descriptors for these features points. The result may stored in the file system/database(s) and the ordered set of feature points is stored as a vector in a variable (e.g., named template_feature_points) and the count of feature points is stored in a variable (e.g., named template_feature_point_count).

Match Set of Test Images Against Template

Next, match a representative sample of test image against this template using the standard matching algorithm described earlier (FIG. 4(a), at 404). The result is a set of candidate matches stored in the database.

In alternative embodiments, many template images can be matched against the same sample of test images producing candidate matches for all of test images against all of the templates. The result of this would then be used in the subsequent processing for developing the minimal feature point matching for a set of templates.

Review Matches or Classify

With reference to FIG. 4(a), at 406, the matches are reviewed and/or classified. A human may review all or some of the candidate matches. The human would tag the candidate matches as true positives or false positives. This would produce a set of true positive matches. In addition to or instead of the hand tagged matches or as a replacement for the hand tagging process, a classifier may be used to generate a set of true positive matches. A classifier that labels true and false positive matches is described in co-owned and co-pending U.S. patent application No. 62/022,619 and U.S. patent application Ser. No. 14/745,363, filed Jun. 19, 2015, the entire contents of both of which have been fully incorporated herein by reference for all purposes.

For the minimal feature point computations only the true positive matches are needed. Ideally a large set of true positive matches would be created, on the order of a hundred to a few thousand. In addition, it is preferable if the true positive matches come from a statistically valid sample of the population of test images.

Determine Maximum Matching Distance for All Template Feature Points

With reference to FIG. 4(a), at 408, now determine the maximum matching distance for all template feature points.

In the standard matching process, we determine which feature points of the template image are close enough (in feature space) to the feature points of the test image using a combination of tests. The primary test is a ratio test. The ratio test looks at the ratio between the two distances: the distance from the feature point in the test image to the closest point in the template image and the distance from the feature point in the test image to the second closest point in the template image.

As part of this mechanism we are determining possible matches with a reduced set of feature points for the template image. Because we are using a limited set of feature points for the template image, the ratio test is not effective. Accordingly, an absolute distance threshold is used instead. We determine the correct distance threshold on a feature point by feature point basis. Associated with each template feature point is an absolute threshold used to constrain the distance of a valid matching feature point. The absolute thresholds are derived empirically from the set of true positive matches. The insight is that if future test images are similar to the images that are part of the true positive matches, then the maximum distance between a template feature point and a feature point in any of the true positive matches, is a reasonable cutoff—since this cutoff is obeyed (although it was not directly applied) by all known true positive matches, it should work reasonably well for future matches.

To calculate the maximum matching distance for all of the feature points of the template image, we first initialize a vector of max_distances. The vector is the length of number of feature points in the template image and the elements are initialized to 0. Next, we iterate over the true positive matches. For each true positive match, we iterate over the match set and in lock step iterate over the distances stored in the match record. For each element of the match set, we get from the pair of values the index of the template's feature point (named, e.g., template_feature_point_index). We also retrieve the corresponding distance from the distances (named, e.g., feature_point_distance). We then update the element of the max_distances vector indexed by the template_feature_point_index to the maximum of that elements current value and the feature_point_distance.

In an alternative implementation, in addition to calculating the maximum (worst) distance for every feature point of the template image, we may also calculate the distribution of distances for each feature point. The distribution may be use to calculate a distance that fit most of the true positive matches rather than all. The 95th percentile or any other selected percentile could be computed from the distribution of distances for each feature point. This other distance thresholds would be the same or smaller and thus a weaker constraint.

As an alternative, the maximum distance can be determine for each feature point only from the true positive matches where that specific feature point is only the feature point in the match set of the true positive match that is in the minimal feature point set. In this alternative, the maximum distance would have to be computed after the minimum feature set was determined. Again, this distance threshold would be a lower threshold (or the same) since it is computed from a subset of the true positive matches. A lower threshold would mean a higher rejection rate by the filter although some of the rejected images might be actual true positive matches. Another alternative to the maximum distance uses a threshold based on the worst distance of any true match. In a test the ratio test was used with the second nearest feature point. That second nearest feature point distance may be used as a cutoff (this would be larger than the actual match distance).

Determine How Well Each Feature Point Discriminates Between Matches and Non-Matches With reference to FIG. 4(a), at 410, now determine how well each feature point discriminates between matches and non-matches.

Some template feature points may only match feature points in true positive images while other feature points may be common in the general universe of test images. This second attribute we refer to as the discriminating power of a feature point—it is a measure of how likely is it that a test image that matches a template feature point is a true positive match.

We gather data for computing this measure by matching each template feature point against a large set of test images. We iterate over a set of test image and each template feature point is compared to each feature point of the test image. A test image is considered to be a match for a feature point if the distance between the template feature point and any feature point in the test image is less than the maximum distance for this template feature point retrieved from the max_distances vector. We keep a count per template feature point of how many test images match. The result is stored in a vector the length of the number of feature points. The vector is called all_matches and the value is found in the vector for a template feature point indexed by the feature point's index. The information in all_matches may be used in determining the minimum set covering.

An alternate approach to generate information about how well each point discriminates between true matches and non-matches may use the technique described in "Evaluating The Quality Of Individual Sift Features" by Hui Su, et al., IEEE, ISIP 2012, the entire contents of which are hereby fully incorporated herein by reference for all purposes. Su et al discuss issues of feature points being so wide that it makes it hard to get enough data about each feature point. Instead of looking at frequencies for the actual feature points Su et al first associate each feature point with a cluster center and look at the frequencies for the cluster as an estimate of the frequency for the actual feature point.

Determine Minimum Set Covering

With reference to FIG. 4(a), at 412, now determine the minimum covering set for the template image.

Finding the best set of feature points for the filtering stage can be viewed as a set covering problem. Each of the feature points of the template image is part of the match set of some subset of true positive matches and can be considered to cover those true positive matches. Together all of the active feature points cover all of the positive matches. The union of the positive matches from each point is equal to all. Those of ordinary skill in the art will realize and appreciate, upon reading this description, that there may be many possible covering sets. It should be appreciated that a goal of this approach is to minimize the number of feature points. However, since in terms of total processing time of a test image with respect to a template image, the number of feature points in the minimal feature set is only one component. Accordingly, in some aspects, instead of minimizing the count of feature points in the minimal feature point set, we preferably minimize a function that incorporates the total processing cost implicit in adding each feature point to the set. The result of finding the minimum set covering is stored as a vector in a variable named, e.g., minimal_feature_points. The entries of this vector are indices into the template_feature_points.

Solving the minimum set cover is an NP-hard problem. However, an approximate solution is adequate for our purposes. We use a greedy algorithm to determine an approximate minimum set cover. Other algorithms could also be used including hybrids of greedy algorithms with the addition of backtracking.

The algorithm initializes variables and then proceeds (iterates) until all true positive matches are covered. At each step of the iteration pick the feature point that covers the most remaining true positive matches, add this point to the minimal feature points and remove from the remaining true positives all of the matches covered by this new feature point.

The initialization step of the algorithm sets up the following:
  all of the true positive matches are put in a vector named remaining_matches.
  a vector named minimal_feature_points is initialized to empty (zero length).

At each step of iteration, we first check if there are any remaining_matches. If there are not, then we are done and return the minimal_feature_points as the result of the filter. If not, we compute the number of remaining_matches covered by each of the feature point in the remaining_feature_points. The number of matches covered is stored as a vector in a variable, e.g., named matches_covered. The elements of the vector are initialized to zero.

A nested iteration over the elements of the remaining_matches is performed. During the iteration the current match is stored in a variable named remaining_match.

In a further nested loop, the match pairs of the match set of the remaining_match are iterated over. The first element of each match pair is an index of feature point of the template it is stored in a variable named match_pair_template_index. In the body of the match set loop, the matches_covered entry indexed by the match_pair_template_index is incremented. This is also the end of the remaining_matches loop.

The result of finding the minimum set covering is stored as a vector in a variable named, minimal_feature_points. The entries of this vector are indices into the template_feature_points and range from 0 to one less than the number of feature points for the template.

In an alternative implementations, instead of re-computing the matches_covered vector from scratch, it can be computed incrementally by decrementing the corresponding entries when a new feature point is selected and added to the minimal_feature_points.

The index of the largest entry of the matches_covered is found. This index is stored in a variable named new_minimal_feature_point. The new_minimal_feature_point is added to the end of the minimal_feature_points vector.

Another loop is now done to update the remaining_matches. The mechanism loops over each of the remaining_matches and checks if the match contains in its match set the new_minimal_feature_point. If it does, then this match is now covered and is removed from the remaining_matches vector. This is the end of the main loop.

Alternative implementations may not try to cover all of the true positive matches. We can stop when a large enough percentage of the true positives are covered. The resulting minimal feature point set is likely to (incorrectly) filter true positive matches more often thus reducing the sensitivity of the overall matching process. However, the filter would run faster with a smaller minimal feature point set.

Generally, the minimal feature point set is derived from empirical results—it is based on a set of matches and not every possible match. Therefore it is approximate. It relies on the observation that having seen a certain number of randomly selected test images; newer test images will be similar to ones already seen. And if they match, they are very likely to be having a subset of matching template feature points already seen.

A process referred to as boosting may be used as part of the matching process, as described in U.S. Patent Application No. 62/022,592, filed Jul. 9, 2014 and in U.S. patent application Ser. No. 14/745,353, filed Jun. 19, 2015, the entire contents of each of which are hereby fully incorporated herein by reference for all purposes. If boosting is used as part of the matching process, then the minimal feature points are determined from a match set determined prior to boosting. The boosted match set includes template points that are not close enough in feature space to match the test image and without boosting would not be part of the match set.

While the covering set algorithm described finds a reduced set of feature points and prefers feature points that cover many matches, it may include feature points that may also be near in the feature space to feature points of non-matching images. These feature points are not as good at discriminating between true matches and non-matches. In an alternative implementation, the mechanism prioritizes selecting feature points that both cover many true positive matches and do not match too many non-matching images. One way of doing this is, instead of selecting the feature point with the greatest coverage of the remaining true positive matches (maximum value in the matches_covered vector), to select the feature point with the greatest ratio of true positive coverage to all matches. The feature point index is chosen that has the maximum value of the ratio between the entry in the matches_covered vector and the corresponding entry in the all_matches vector.

Picking more discriminating feature points may mean we have a larger minimal feature point set and this would mean that the filter would be slower to compute. As an alternative, we can optimize the minimal feature point set taking into account the estimated full cost (processing time) of the two step matching process. The full cost would include two terms. One term is the cost of the filter and this grows as the number of feature points in the minimal feature point set grows. The second term is the cost of the full match times the percentage of time that a full match is needed. We can estimate how often a full match is needed for a given minimal feature point set using the data in the all_matches vector. This optimization may be done using a greedy algorithm with backtracking or some other optimization technique.

As an alternative, we can find the minimal covering set where each true positive match is covered by two feature points and not just one. This is likely to enlarge the minimal feature point set, but it is likely to lower the chances that a true positive test image will be incorrectly filtered.

Source code for an exemplary implementation of this mechanism is in the following tables. This code picks the feature point with the shortest distance if two feature points cover the same number of matches.

```
def minimal_feature_points_from_matches(directory)
  # first load the data for all of the photos
  all_photos = []
  Pathname(directory).each_child do |file|
    if file.basename.to_s.match(/\.json$/i)
      photo_data = JSON.parse(File.read(file))
      if photo_data['logo_indices_original'] && !photo_data['logo_indices'].empty? &&
          photo_data['matches'] > 5
        all_photos << {:logo_distances => photo_data['logo_distances'],
          :logo_indices => photo_data['logo_indices'],
          :logo_distances_original => photo_data['logo_distances_original'],
          :logo_indices_original => photo_data['logo_indices_original']}
      end
    end
  end
```

-continued

```
  # now calculate the worst distance for each index
  index_distances_hash = index_distances(all_photos)
  # now calculate the indices with the most photos
  minimal_points = []
  photos = all_photos.dup
  point_index = 1
  while !photos.empty? do
    new_minimal_index, new_index_distance, photos = most_popular_index(photos, index_distances_hash)
    puts "#{point_index} : index: # {new_minimal_index} with distance # {new_index_distance}"
    minimal_points << {:keypoint_index => new_minimal_index, :distance => new_index_distance}
    point_index += 1
  end
  return minimal_points
end
def index_distances(all_photos)
  index_distances_hash= {}
  all_photos.each do |photo|
    original_indices = photo[:logo_indices_original]
    original_distances = photo[:logo_distances_original]
    original_indices.each_index do |index|
      logo_index = original_indices[index]
      logo_index_distance = original_distances[index]
      if index_distances_hash.has_key?(logo_index)
        index_distances_hash[logo_index] =
[index_distances_hash[logo_index], logo_index_distance].max
      else
        index_distances_hash[logo_index] = logo_index_distance
      end
    end
  end
  index_distances_hash
end
def index_distance(all_photos, new_minimal_index)
  max_distance = nil
  all_photos.each do |photo|
    array_index = photo[:logo_indices_original].index(new_minimal_index)
    if array_index
      distance = photo[:logo_distances_original][array_index]
      if max_distance
        max_distance = [distance, max_distance].max
      else
        max_distance = distance
      end
    end
  end
  max_distance
end
def most_popular_index(photo_group, index_distances_hash)
  index_hash = {}
  photo_group.each_do |photo_entry|
    indices = photo_entry[:logo_indices_original]
    indices.each do |logo_index|
      if index_hash.has_key?(logo_index)
        index_hash[logo_index] += 1
      else
        index_hash[logo_index] = 1
      end
    end
  end
  max = 0
  max_index = nil
  min_distance = nil
  index_hash.each_pair_do |index, count|
    if count > max
      max = count
      max_index = index
      min_distance = index_distances_hash[index]
    elsif count == max
      distance = index_distances_hash[index]
      if distance < min_distance
        max_index = index
        min_distance = distance
      end
    end
  end
```

-continued

```
# now remove those photos from the group
  new_photo_group = photo_group.delete_if{ |photo_entry|
  photo_entry[:logo_indices_original].include?(max_index) }
    return max_index, min_distance, new_photo_group
  end
```

Using Minimum Set Covering to Speed Matching Process

Figure 4B:
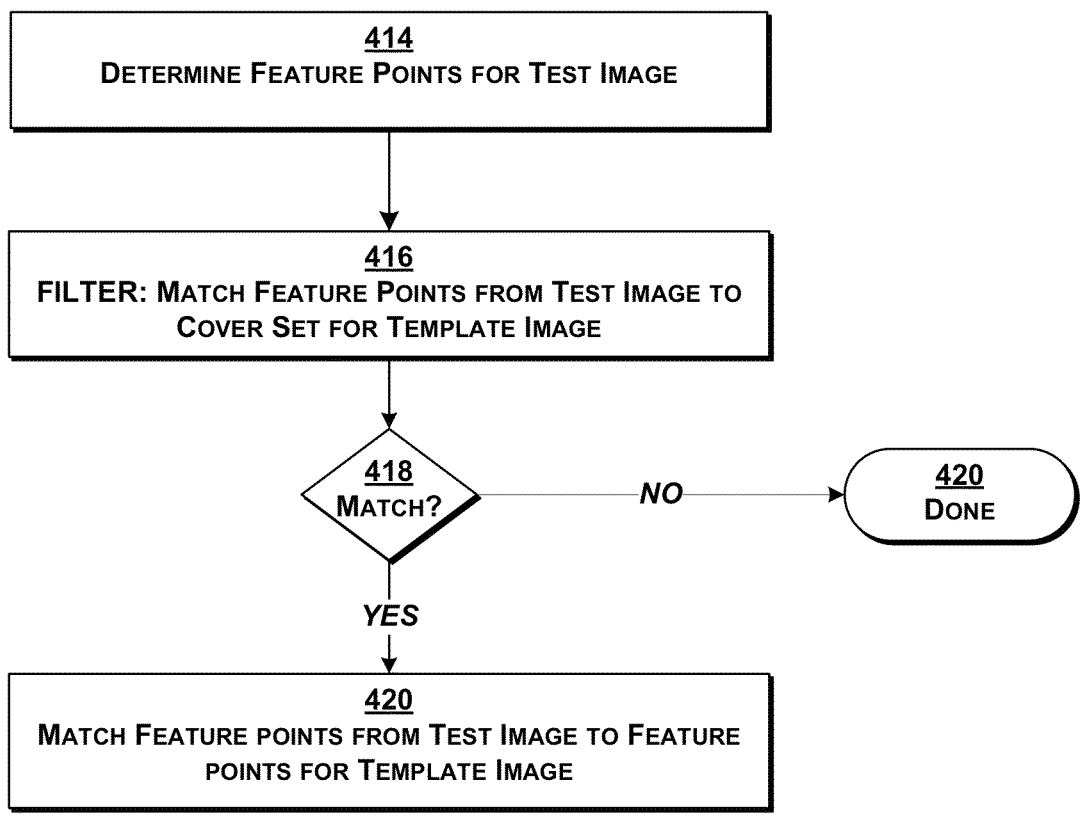

After the minimal_feature_points and max_distances have been computed, the filtering step can be used as part of the matching process. The filtering step is applied to a test image after the feature points for the test image have been extracted/computed (at 414, 416, FIG. 4(*b*)). The filter computes the distance from each of the feature points indexed by the entries in the minimal_feature_points and compares these distances to the max_distances. If any of the feature point to feature point distances is less than the corresponding threshold in the max_distances, then the test image is a possible match to the template and the filter returns FALSE and the second step of matching (420 in FIG. 4(*b*)) should be performed.

The filtering step can be used to speed up matching of a template after the minimal_feature_points and the max_distances have been computed. The filtering step is run after the feature points have been extracted for the test image and before the normal match (at 414, 416, FIG. 4(*b*)). The feature points for the test image are vector named test_feature_points.

The filtering step iterates over the feature points indices in the minimal_feature_points vector. The entry of the minimal_feature_points vectors is stored in a variable named template_feature_point_index. The feature point is looked up in the template_feature_point vector using the template_feature_point_index as the index into the vector. The point is stored in a variable named template_feature_point. A nested iteration is done that iterates over all of the feature points of the test image, test_feature_point. The test image feature point is stored in a variable named test_feature_point. Each time through the inner loop, the distance, feature_point_distance, is computed between the template_feature_point and the test_feature_point. This distance may be computed using the same distance function as is used in the standard matching process. Other distance functions could be used in here too. The same distance function should be used in the filter step and the normal match step. The threshold for the distance, threshold_distance, is looked up in the max_distances vector using as an index the template_feature_point_index. The distance, feature_point_distance is compared to the threshold, threshold_distance, and if the distance is less than or equal to the threshold, feature_threshold, then that point is a potential match and the test_image is potential match, so we exit both loops and the filter returns FALSE to indicate that the normal match step must be done. If the outer loop completes iterating over the template feature points, then there is no template feature point too close to one of the minimal feature points and the filter returns TRUE to indicate that this test image is not a potential match and need not be processed further (at 420, FIG. 4(*b*)).

As an alternative to using a distance threshold and having any point that has a distance under that threshold result in not filtering, a model (e.g. SVM) may be trained to take as input the distances for the minimal feature set points and determine the result of the filter.

The input to the model would be the width of the minimal feature points. The input values in the vector may be the computed distances for the minimal feature points to the test image feature point (or 0 if this point is not a match). The true positive examples would be used as examples to the model for training and labeled with "true." A set of non-matches would also be used as training examples and labeled with "false." A linear SVM or other model may be trained with this data. The training may be done such that the model would have the minimum of the number of mislabeled "trues" while maximizing the number of correctly labeled "falses". In other words, since it is to be used a filter, we want it to filter out as many non-matches as possible while filtering out as few true positive matches as possible.

EXAMPLE

Experimental Results

In experiments with a set of templates, the number of minimal feature points was on average 1/25 the total number of feature points for the same template. The filter step rejected an average of 97% of the non-matching images tested. This implies that matching with the filter step would be approximately 14 times faster than matching without the filter step. A less than 1% decrease in sensitivity was shown. This was due to a few true positive matches being incorrectly the filtered i.e. false positives.

For a set of 1,152 logos that are used as templates, there are an average of 193 feature points for each template. Some examples of the number of minimal feature points vs. all feature points:

932→31 heineken
619→26 budlight
505→26 budlight lime
131→27
238→18
End of Example In some cases results of the filtering process may be subsequently used for the full match. In addition, if feature points are ordered by their importance, then the filter has essentially done the most important points in priority order—the ones that cover the most images are the most important.

As described, we have computed a set of points where every matching image is covered by at least one point in this set.

We can also compute the set of points that would get a two point covering of very image. We can treat the one point set as a first filter stage. If we checked the additional points in the two point cover next, that would be a second filter and every test image would have to have at least two matching points to get through that filter. Random chance matches might not make it through two stages, and the second stage would still be less than all of the points. The results could be used in the full match. It should be appreciated that this requires a test other than the ratio test. This could continue for more stages of filters. The matching could thereby effectively be done with a cascade of filters.

Incorporation into a System

The covering set for a template image may be determined as part of the initial setup for that template image (e.g., initial setup 302 in FIG. 3(*a*)). Preferably the covering set data are maintained in the template image database(s) 108. The filtering process may be incorporated, e.g., into the process single image mechanism 304 (in FIG. 3(*b*)), where incoming test images are checked against the cover set for each template image, either as a final determination or as a filter for subsequent processing.

Application of Techniques

The framework, system, techniques and mechanisms described herein have general applicability. However, in a presently preferred implementation the template images comprise logos and the like corresponding to products (e.g., goods and services) related to certain companies or other entities.

As used herein a logo refers to any symbol, image, text, or other design, or combination thereof, adopted or used by an entity to identify its products, goods, services, etc.

In some cases the system may use multiple versions of the same logo (e.g., at different sizes).

In operation multiple test images in one or more input streams are processed with respect to multiple logos from multiple entities.

Template images found in a test image may be used to provide targeted advertising.

Computing

Programs that implement such methods (as well as other types of data) may be stored and transmitted using a variety of media (e.g., computer readable media) in a number of manners. Hard-wired circuitry or custom hardware may be used in place of, or in combination with, some or all of the software instructions that can implement the processes of various embodiments. Thus, various combinations of hardware and software may be used instead of software only.

Figure 5:
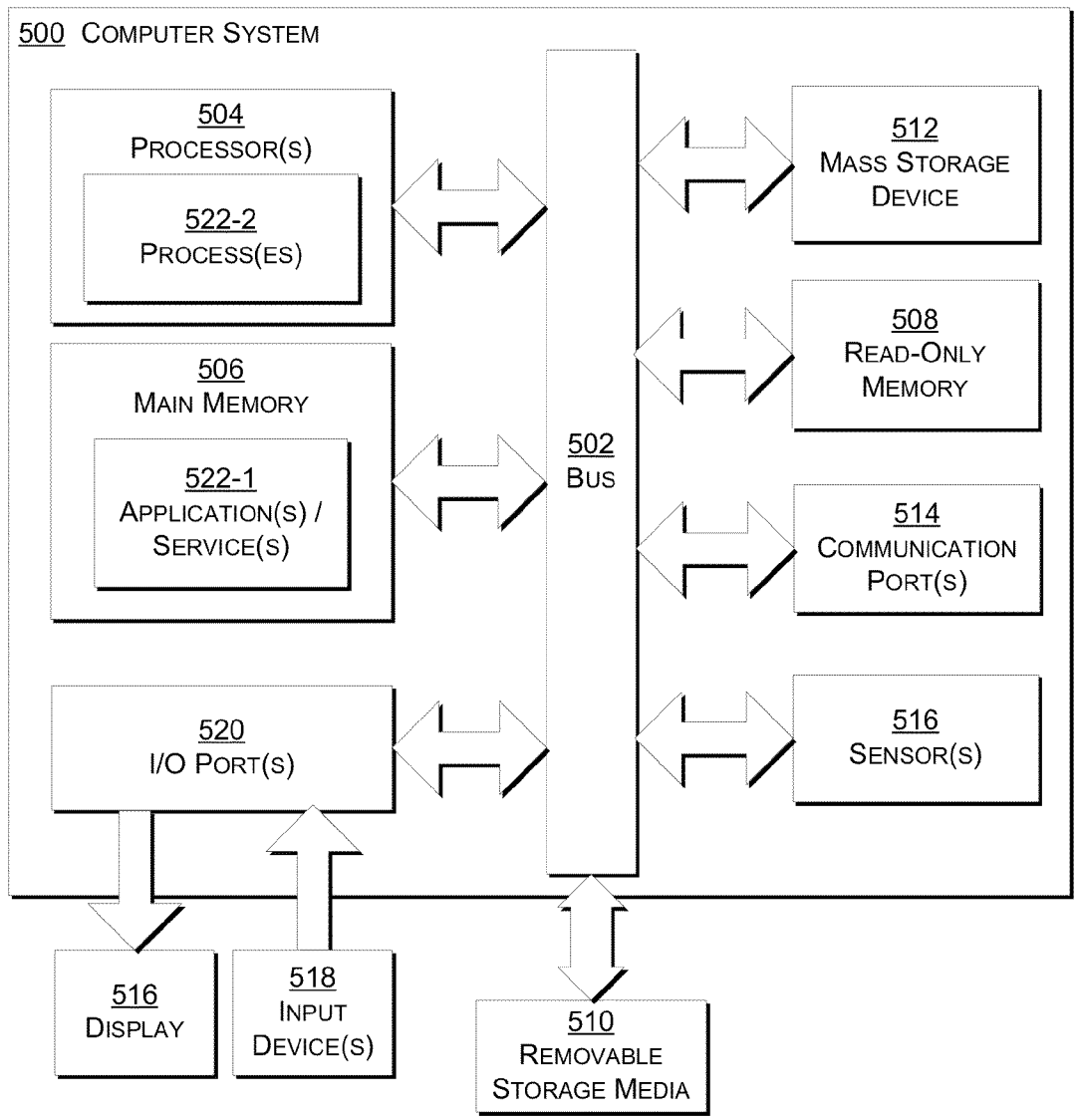
FIG. 5 is a schematic diagram of a computer system.

FIG. 5 is a schematic diagram of a computer system 500 upon which embodiments of the present disclosure may be implemented and carried out.

According to the present example, the computer system 500 includes a bus 502 (i.e., interconnect), one or more processors 504, one or more communications ports 514, a main memory 506, removable storage media 510, read-only memory 508, and a mass storage 512. Communication port(s) 514 may be connected to one or more networks by way of which the computer system 500 may receive and/or transmit data.

As used herein, a "processor" means one or more microprocessors, central processing units (CPUs), computing devices, microcontrollers, digital signal processors, or like devices or any combination thereof, regardless of their architecture. An apparatus that performs a process can include, e.g., a processor and those devices such as input devices and output devices that are appropriate to perform the process.

Processor(s) 504 can be (or include) any known processor, such as, but not limited to, an Intel® Itanium® or Itanium 2® processor(s), AMD® Opteron® or Athlon MP® processor(s), or Motorola® lines of processors, and the like. Processor(s) may include one or more graphical processing units (GPUs) which may be on graphic cards or stand-alone graphic processors.

Communications port(s) 514 can be any of an RS-232 port for use with a modem based dial-up connection, a 10/100 Ethernet port, a Gigabit port using copper or fiber, or a USB port, and the like. Communications port(s) 514 may be chosen depending on a network such as a Local Area Network (LAN), a Wide Area Network (WAN), a CDN, or any network to which the computer system 500 connects. The computer system 500 may be in communication with peripheral devices (e.g., display screen 516, input device(s) 518) via Input/Output (I/O) port 520. Some or all of the peripheral devices may be integrated into the computer system 500, and the input device(s) 518 may be integrated into the display screen 516 (e.g., in the case of a touch screen).

Main memory 506 can be Random Access Memory (RAM), or any other dynamic storage device(s) commonly known in the art. Read-only memory 508 can be any static storage device(s) such as Programmable Read-Only Memory (PROM) chips for storing static information such as instructions for processor(s) 504. Mass storage 512 can be used to store information and instructions. For example, hard disks such as the Adaptec® family of Small Computer Serial Interface (SCSI) drives, an optical disc, an array of disks such as Redundant Array of Independent Disks (RAID), such as the Adaptec® family of RAID drives, or any other mass storage devices may be used.

Bus 502 communicatively couples processor(s) 504 with the other memory, storage and communications blocks. Bus 502 can be a PCI/PCI-X, SCSI, a Universal Serial Bus (USB) based system bus (or other) depending on the storage devices used, and the like. Removable storage media 510 can be any kind of external hard-drives, floppy drives, IOMEGA® Zip Drives, Compact Disc-Read Only Memory (CD-ROM), Compact Disc-Re-Writable (CD-RW), Digital Versatile Disk-Read Only Memory (DVD-ROM), etc.

Embodiments herein may be provided as one or more computer program products, which may include a machine-readable medium having stored thereon instructions, which may be used to program a computer (or other electronic devices) to perform a process. As used herein, the term "machine-readable medium" refers to any medium, a plurality of the same, or a combination of different media, which participate in providing data (e.g., instructions, data structures) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory, which typically constitutes the main memory of the computer. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications.

The machine-readable medium may include, but is not limited to, floppy diskettes, optical discs, CD-ROMs, magneto-optical disks, ROMs, RAMs, erasable programmable read-only memories (EPROMs), electrically erasable programmable read-only memories (EEPROMs), magnetic or optical cards, flash memory, or other type of media/machine-readable medium suitable for storing electronic instructions. Moreover, embodiments herein may also be downloaded as a computer program product, wherein the program may be transferred from a remote computer to a requesting computer by way of data signals embodied in a carrier wave or other propagation medium via a communication link (e.g., modem or network connection).

Various forms of computer readable media may be involved in carrying data (e.g. sequences of instructions) to a processor. For example, data may be (i) delivered from RAM to a processor; (ii) carried over a wireless transmission medium; (iii) formatted and/or transmitted according to numerous formats, standards or protocols; and/or (iv) encrypted in any of a variety of ways well known in the art.

A computer-readable medium can store (in any appropriate format) those program elements that are appropriate to perform the methods.

As shown, main memory 506 is encoded with application(s) 522 that support(s) the functionality as discussed herein (an application 522 may be an application that provides some or all of the functionality of one or more of the mechanisms described herein). Application(s) 522 (and/or other resources as described herein) can be embodied as software code such as data and/or logic instructions (e.g., code stored in the memory or on another computer readable medium such as a disk) that supports processing functionality according to different embodiments described herein.

During operation of one embodiment, processor(s) 504 accesses main memory 506 via the use of bus 502 in order to launch, run, execute, interpret or otherwise perform the logic instructions of the application(s) 522. Execution of application(s) 522 produces processing functionality of the service(s) or mechanism(s) related to the application(s). In other words, the process(es) 524 represents one or more portions of the application(s) 522 performing within or upon the processor(s) 504 in the computer system 500.

It should be noted that, in addition to the process(es) 524 that carries (carry) out operations as discussed herein, other embodiments herein include the application 522 itself (i.e., the un-executed or non-performing logic instructions and/or data). The application 522 may be stored on a computer readable medium (e.g., a repository) such as a disk or in an optical medium. According to other embodiments, the application 522 can also be stored in a memory type system such as in firmware, read only memory (ROM), or, as in this example, as executable code within the main memory 506 (e.g., within Random Access Memory or RAM). For example, application 522 may also be stored in removable storage media 510, read-only memory 508, and/or mass storage device 512.

Those skilled in the art will understand that the computer system 500 can include other processes and/or software and hardware components, such as an operating system that controls allocation and use of hardware resources.

Embodiments herein may be provided as a computer program product, which may include a machine-readable medium having stored thereon instructions, which may be used to program a computer (or other electronic devices) to perform a process. As used herein, the term "machine-readable medium" refers to any medium, a plurality of the same, or a combination of different media, which participate in providing data (e.g., instructions, data structures) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory, which typically constitutes the main memory of the computer. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications.

The machine-readable medium may include, but is not limited to, floppy diskettes, optical discs, CD-ROMs, magneto-optical disks, ROMs, RAMs, erasable programmable read-only memories (EPROMs), electrically erasable programmable read-only memories (EEPROMs), magnetic or optical cards, flash memory, or other type of media/machine-readable medium suitable for storing electronic instructions. Moreover, embodiments herein may also be downloaded as a computer program product, wherein the program may be transferred from a remote computer to a requesting computer by way of data signals embodied in a carrier wave or other propagation medium via a communication link (e.g., modem or network connection).

Various forms of computer readable media may be involved in carrying data (e.g. sequences of instructions) to a processor. For example, data may be (i) delivered from RAM to a processor; (ii) carried over a wireless transmission medium; (iii) formatted and/or transmitted according to numerous formats, standards or protocols; and/or (iv) encrypted in any of a variety of ways well known in the art.

A computer-readable medium can store (in any appropriate format) those program elements that are appropriate to perform the methods.

Those skilled in the art will understand that the computer system 700 can include other processes and/or software and hardware components, such as an operating system that controls allocation and use of hardware resources.

As discussed herein, embodiments of the present invention include various steps or operations. A variety of these steps may be performed by hardware components or may be embodied in machine-executable instructions, which may be used to cause a general-purpose or special-purpose processor programmed with the instructions to perform the operations. Alternatively, the steps may be performed by a combination of hardware, software, and/or firmware. The term "module" refers to a self-contained functional component, which can include hardware, software, firmware or any combination thereof.

One of ordinary skill in the art will readily appreciate and understand, upon reading this description, that embodiments of an apparatus may include a computer/computing device operable to perform some (but not necessarily all) of the described process.

Embodiments of a computer-readable medium storing a program or data structure include a computer-readable medium storing a program that, when executed, can cause a processor to perform some (but not necessarily all) of the described process.

Where a process is described herein, those of skill in the art will appreciate that the process may operate without any user intervention. In another embodiment, the process includes some human intervention (e.g., a step is performed by or with the assistance of a human).

Real Time

Those of ordinary skill in the art will realize and understand, upon reading this description, that, as used herein, the term "real time" means near real time or sufficiently real time. It should be appreciated that there are inherent delays in network-based and computer communication (e.g., based on network traffic and distances), and these delays may cause delays in data reaching various components. Inherent delays in the system do not change the real-time nature of the data. In some cases, the term "real-time data" may refer to data obtained in sufficient time to make the data useful for its intended purpose. Although the term "real time" may be used here, it should be appreciated that the system is not limited by this term or by how much time is actually taken to perform any particular process. In some cases, real time computation may refer to an online computation, i.e., a computation that produces its answer(s) as data arrive, and generally keeps up with continuously arriving data. The term "online" computation is compared to an "offline" or "batch" computation.

Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, whether in the written description or the claims, "plurality" means two or more.

As used herein, whether in the written description or the claims, the terms "comprising", "including", "having", "containing", "involving", and the like are to be understood to be open-ended, that is, to mean including but not limited to. Only the transitional phrases "consisting of" and "consisting essentially of", respectively, are closed or semi-closed transitional phrases with respect to claims.

As used herein, "and/or" means that the listed items are alternatives, but the alternatives also include any combination of the listed items.

As used in this description, the term "portion" means some or all. So, for example, "A portion of X" may include some of "X" or all of "X". In the context of a conversation, the term "portion" means some or all of the conversation.

As used herein, including in the claims, the phrase "at least some" means "one or more," and includes the case of only one. Thus, e.g., the phrase "at least some ABCs" means "one or more ABCs", and includes the case of only one ABC.

As used herein, including in the claims, the phrase "based on" means "based in part on" or "based, at least in part, on," and is not exclusive. Thus, e.g., the phrase "based on factor X" means "based in part on factor X" or "based, at least in part, on factor X." Unless specifically stated by use of the word "only", the phrase "based on X" does not mean "based only on X."

As used herein, including in the claims, the phrase "using" means "using at least," and is not exclusive. Thus, e.g., the phrase "using X" means "using at least X." Unless specifically stated by use of the word "only", the phrase "using X" does not mean "using only X."

In general, as used herein, including in the claims, unless the word "only" is specifically used in a phrase, it should not be read into that phrase.

As used herein, including in the claims, the phrase "distinct" means "at least partially distinct." Unless specifically stated, distinct does not mean fully distinct. Thus, e.g., the phrase, "X is distinct from Y" means that "X is at least partially distinct from Y," and does not mean that "X is fully distinct from Y." Thus, as used herein, including in the claims, the phrase "X is distinct from Y" means that X differs from Y in at least some way.

As used herein, including in the claims, a list may include only one item, and, unless otherwise stated, a list of multiple items need not be ordered in any particular manner. A list may include duplicate items. For example, as used herein, the phrase "a list of XYZs" may include one or more "XYZs".

It should be appreciated that the terms "first", "second", "third," and so on, if used in the claims, are used to distinguish or identify, and not to show a serial or numerical limitation. Similarly, the use of letter or numerical labels (such as "(a)", "(b)", and the like) are used to help distinguish and/or identify, and not to show any serial or numerical limitation or ordering. Specifically, use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

The foregoing is merely illustrative and not limiting, having been presented by way of example only. Although examples have been shown and described, it will be apparent to those having ordinary skill in the art that changes, modifications, and/or alterations may be made.

Thus is provided a framework for finding template images in test or target images, including using feature point extraction using minimal feature points to improve match quality and speed.

While the invention has been described in connection with what is presently considered to be the most practical and preferred embodiments, it is to be understood that the invention is not to be limited to the disclosed embodiment, but on the contrary, is intended to cover various modifications and equivalent arrangements included within the spirit and scope of the appended claims.

What is claimed:

1. A computer-implemented method, implemented by hardware in combination with software, the method comprising:

for each particular template image of a plurality of template images:

(A) determining a first set of feature points associated with said particular template image;

(B) determining a second set of feature points associated with said particular template image, said second set of feature points (i) being a subset of said first set of feature points, and (ii) comprising fewer feature points than said first set of feature points;

(C) associating said first set of feature points and said second set of feature points with said particular template image; and (D) storing said first set of feature points and said second set of feature points, wherein said second set of feature points associated with said particular template image comprises a cover set of feature points associated with said particular template image, and wherein the cover set comprises a subset of said feature points associated with said particular template image wherein one of the feature points in the cover set is associated with substantially every true positive match of feature points associated with said particular template image with feature points associated with a test image.

2. The method of claim 1 wherein said cover set of feature points associated with said particular template image comprises a substantially minimal cover set of feature points associated with said particular template image.

3. The method of claim 1 wherein said first set of feature points and said second set of feature points are stored in a database and are accessible from said database using an identification of said particular template image.

4. A computer-implemented method for determining whether a portion of a first image is located within a second image, the method, implemented by hardware in combination with software, the method comprising:

(A) determining whether a first set of feature points associated with the first image match a set of feature points associated with the second image; and then (B) based on said determining in (A), when it is determined that said first set of feature points associated with the first image match the set of feature points associated with the second image, then determining whether said portion of said first image is located within said second image based on whether or not a second set of feature points associated with the first image match the set of feature points associated with the second image, wherein said first set of feature points: (i) is a subset of said second set of feature points, and (ii) comprises fewer feature points than said second set of feature points.

5. The method of claim 4 wherein said first set of feature points associated with said first image comprises a cover set of feature points associated with said first image.

6. The method of claim 4 wherein said first set of feature points associated with said first image comprises a substantially minimal cover set of feature points associated with said first image.

7. The method of claim 5 wherein the cover set comprises a subset of feature points associated with said first image, wherein at least one feature point in the cover set is associated with substantially every true positive match of feature points associated with said first image with feature points associated with a test image.

8. The method of claim 4 further comprising:
   prior to said determining in (A), obtaining said first set of feature points.

9. The method of claim 8 wherein said first set of feature points is obtained from a database using an identification of said first image.

10. The method of claim 4 further comprising:
    obtaining said second set of feature points.

11. A computer program product having computer readable instructions stored on non-transitory computer readable media, the computer readable instructions including instructions for implementing a computer-implemented method, said method operable on one or more devices comprising hardware including memory and at least one processor and running one or more services on said hardware, said method comprising:
    for each particular template image of a plurality of template images:
    (A) determining a first set of feature points associated with said particular template image;
    (B) determining a second set of feature points associated with said particular template image, said second set of feature points (i) being a subset of said first set of feature points, and (ii) comprising fewer feature points than said first set of feature points;
    (C) associating said first set of feature points and said second set of feature points with said particular template image; and
    (D) storing said first set of feature points and said second set of feature points,
    wherein said second set of feature points associated with said particular template image comprises a cover set of feature points associated with said particular template image, and
    wherein the cover set comprises a subset of said feature points associated with said articular template image wherein one of the feature points in the cover set is associated with substantially every true positive match of feature points associated with said particular template image with feature points associated with a test image.

12. The computer program product of claim 11 wherein said cover set of feature points associated with said particular template image comprises a substantially minimal cover set of feature points associated with said particular template image.

13. The computer program product of claim 11 wherein said first set of feature points and said second set of feature points are stored in a database and are accessible from said database using an identification of said particular template image.

* * * * *